(12) United States Patent
Dang

(10) Patent No.: US 12,504,512 B2
(45) Date of Patent: Dec. 23, 2025

(54) JOINT CALIBRATION METHOD AND APPARATUS, ELECTRONIC DEVICE AND UNMANNED AERIAL VEHICLE

(71) Applicant: AUTEL ROBOTICS CO., LTD., Shenzhen (CN)

(72) Inventor: Yanfeng Dang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 304 days.

(21) Appl. No.: 18/205,411

(22) Filed: Jun. 2, 2023

(65) Prior Publication Data

US 2023/0408643 A1 Dec. 21, 2023

(30) Foreign Application Priority Data

Jun. 17, 2022 (CN) .......................... 202210692416.9

(51) Int. Cl.
| | | |
|---|---|---|
| *G01S 7/40* | (2006.01) | |
| *G01S 13/89* | (2006.01) | |
| *G06V 10/74* | (2022.01) | |
| *G06V 20/17* | (2022.01) | |

(52) U.S. Cl.
CPC ............ *G01S 7/4004* (2013.01); *G01S 13/89* (2013.01); *G06V 10/74* (2022.01); *G06V 20/17* (2022.01)

(58) Field of Classification Search
CPC combination set(s) only.
See application file for complete search history.

(56) References Cited

U.S. PATENT DOCUMENTS 12,260,773 B1 * 3/2025 Kysar et al. .............. G06T 7/80
348/148

FOREIGN PATENT DOCUMENTS

CN 113466809 A * 10/2021 ............... G01S 3/48

* cited by examiner

*Primary Examiner* — Vladimir Magloire
(74) *Attorney, Agent, or Firm* — Arch & Lake LLP

(57) ABSTRACT

A joint calibration method is implemented in an unmanned aerial vehicle. In the method, pose information of a detection radar is obtained, and the pose information includes a ground height of the detection radar and a pitch angle of the detection radar. Target calibration parameters matching the pose information in a preset calibration parameter set are obtained. The calibration parameter set includes groups of calibration parameters, and each group of calibration parameters matching a pose information interval and the pose information interval includes a height interval and a pitch angle interval. A spatial conversion relationship between the detection radar and an image acquisition device is determined based on the target calibration parameters.

20 Claims, 11 Drawing Sheets

|  | $H_1$ | $H_2$ | ... | $H_{m-1}$ | $H_m$ |
|---|---|---|---|---|---|
| $\alpha_1$ | $[R_{11} \ t_{11}]$ | $[R_{21} \ t_{21}]$ | ... | $[R_{(m-1)1} \ t_{(m-1)1}]$ | $[R_{m1} \ t_{m1}]$ |
| $\alpha_2$ | $[R_{12} \ t_{12}]$ | $[R_{22} \ t_{22}]$ | ... | $[R_{(m-1)2} \ t_{(m-1)2}]$ | $[R_{m2} \ t_{m2}]$ |
| ... | ... | ... | ... | ... | ... |
| $\alpha_{n-1}$ | $[R_{1n-1} \ t_{1n-1}]$ | $[R_{2n-1} \ t_{2n-1}]$ | ... | $[R_{(m-1)(n-1)} \ t_{(m-1)(n-1)}]$ | $[R_{m(n-1)} \ t_{m(n-1)}]$ |
| $\alpha_n$ | $[R_{1n} \ t_{1n}]$ | $[R_{2n} \ t_{2n}]$ |  | $[R_{(m-1)n} \ t_{(m-1)n}]$ | $[R_{mn} \ t_{mn}]$ |

FIG. 6

JOINT CALIBRATION METHOD AND APPARATUS, ELECTRONIC DEVICE AND UNMANNED AERIAL VEHICLE

CROSS-REFERENCE TO RELATED APPLICATION

This application claims priority of Chinese Patent Application No. 202210692416.9, filed on Jun. 17, 2022, titled "JOINT CALIBRATION METHOD AND APPARATUS, ELECTRONIC DEVICE AND UNMANNED AERIAL VEHICLE", the entire disclosure of which is incorporated herein by reference for all purposes.

TECHNICAL FIELD

The present disclosure relates to the field of data fusion technologies, and in particular, to a joint calibration method, a joint calibration apparatus, an electronic device and an unmanned aerial vehicle.

BACKGROUND

With continuous development of electronic information technologies, more and more automation devices, for example, unmanned aerial vehicles, start to be widely used in various industries. A plurality of sensors of different types, for example, millimeter-wave radars and cameras are usually mounted on such automation devices. Such sensor devices have own advantages and characteristics and cooperate with each other to meet use requirements in various application scenarios.

How to fuse data (for example, millimeter-wave radar detection data and visual image data) acquired by a plurality of sensor devices mounted on an automation device so that the automation device can easily integrate different sensor devices is an urgent problem to be resolved currently.

SUMMARY

A joint calibration method, a joint calibration apparatus, an electronic device and an unmanned aerial vehicle that are provided in embodiments of the present disclosure can overcome at least one part of defects of data fusion methods in the related art.

According to a first aspect, the present disclosure provides a joint calibration method. The joint calibration method includes: obtaining, by an unmanned aerial vehicle comprising a detection radar, pose information of the detection radar, the pose information including a ground height of the detection radar and a pitch angle of the detection radar; obtaining, by the unmanned aerial vehicle, target calibration parameters matching the pose information in a preset calibration parameter set, where the calibration parameter set includes a plurality of groups of calibration parameters, each group of calibration parameters matching a pose information interval and the pose information interval including a height interval and a pitch angle interval; and determining, by the unmanned aerial vehicle, a spatial conversion relationship between the detection radar and an image acquisition device based on the target calibration parameters.

According to a second aspect, the present disclosure provides a joint calibration apparatus. The joint calibration apparatus includes: a pose information obtaining module, configured to obtain pose information of a detection radar, the pose information including a ground height of the detection radar and a pitch angle of the detection radar; a calibration parameter search module, configured to obtain target calibration parameters matching the pose information in a preset calibration parameter set, where the calibration parameter set includes a plurality of groups of calibration parameters, each group of calibration parameters matching a pose information interval and the pose information interval including a height interval and a pitch angle interval; and a calibration module, configured to determine a spatial conversion relationship between the detection radar and an image acquisition device based on the target calibration parameters.

According to a third aspect, the present disclosure provides an electronic device. The electronic device includes at least one processor and a memory communicatively connected to the at least one processor, the memory storing instructions executable by the at least one processor, the instructions being executed by the at least one processor, to cause the at least one processor to perform the foregoing joint calibration method.

According to a fourth aspect, the present disclosure provides an unmanned aerial vehicle. The unmanned aerial vehicle includes: a body, a detection radar and an image acquisition device being hung on the body; arms, connected to the body; power apparatuses, disposed on the arms and configured to provide power for the unmanned aerial vehicle to fly; and a flight controller, disposed on the body and communicatively connected to the detection radar and the image acquisition device respectively, where the flight controller stores a preset calibration parameter set and is configured to perform the foregoing joint calibration method, to determine a correspondence between radar data of the detection radar and image data of the image acquisition device.

BRIEF DESCRIPTION OF THE DRAWINGS

One or more embodiments are exemplarily described with reference to the corresponding figures in the accompanying drawings and the descriptions are not to be construed as limiting the embodiments. Components in the accompanying drawings that have same reference numerals are represented as similar components and unless otherwise particularly specified, the figures in the accompanying drawings are not drawn to scale.

FIG. 6 is a schematic diagram of a calibration parameter set according to an embodiment of the present disclosure, which shows a calibration parameter table that records a plurality of groups of calibration parameters and matched pose information intervals.

DETAILED DESCRIPTION

Figure 1:
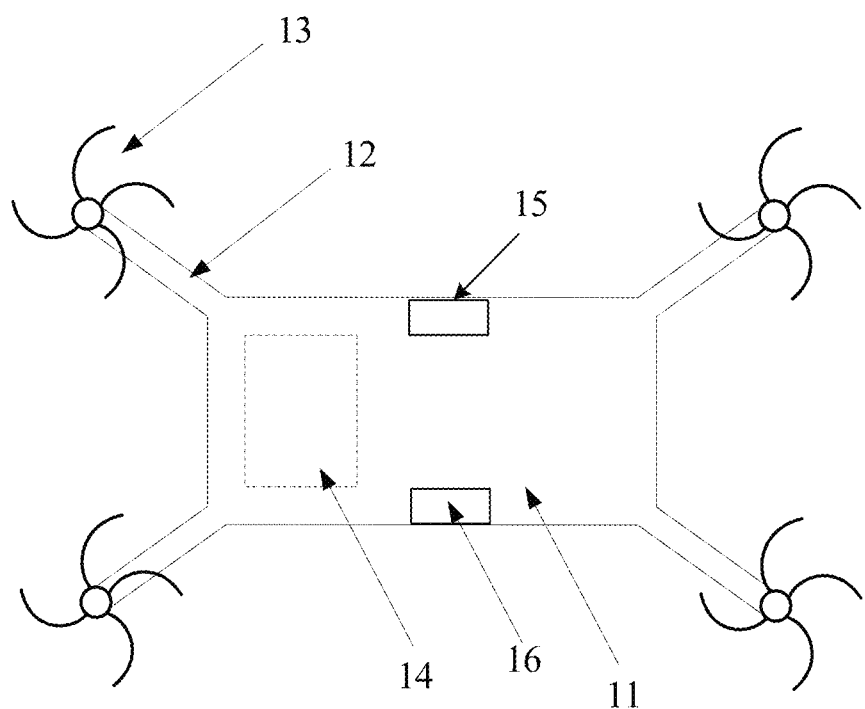
FIG. 1 is a schematic diagram of an application environment according to an embodiment of the present disclosure.

For ease of understanding the present disclosure, the present disclosure is described in further detail below with reference to the accompanying drawings and specific embodiments. It should be noted that, when an element is expressed as "being fixed to" another element, the element may be directly on another element, or one or more intermediate elements may exist between the element and another element. When an element is expressed as "being connected to" another element, the element may be directly connected to another element, or one or more intermediate elements may exist between the element and another element. In the description of this specification, orientation or position relationships indicated by terms such as "up", "down", "inside", "outside" and "bottom" are based on orientation or position relationships shown in the accompanying drawings and are merely used for ease of description of the present disclosure and for brevity of description, rather than indicating or implying that the mentioned apparatus or element needs to have a particular orientation or needs to be constructed and operated in a particular orientation, and therefore should not be understood as a limitation on the present disclosure. In addition, terms such as "first", "second" and "third" are used only for description purpose and shall not be construed as indicating or implying relative importance.

Unless otherwise defined, meanings of all technical and scientific terms used in this specification are the same as that usually understood by a person skilled in the technical field to which the present disclosure belongs. Terms used in the specification of the present disclosure are merely intended to describe objectives of the specific embodiments, but are not intended to limit the present disclosure. A term "and/or" used in this specification includes any or all combinations of one or more related listed items.

In addition, technical features involved in various embodiments of the present disclosure described below may be combined if there is no conflict.

A "millimeter-wave radar" is a detection radar that works in a millimeter-wave band. The millimeter-wave radar has strong penetrating power and can penetrate severe weather such as heavy rain, heavy snow and strong sand and dust. The millimeter-wave radar can also accurately detect weak and small targets in scenarios, for example, degradation of a visual effect caused by a light-intensive environment and a night vision condition. In this way, a problem that an automation device (for example, an unmanned aerial vehicle) suffers from low visibility and degraded sensing under severe conditions is resolved and a space situational sensing capability is enhanced. In the present disclosure, an example of the millimeter-wave radar is used for description in detail. A person skilled in the art may understand that a detection radar of another different type may alternatively be used.

An "image acquisition device" is a sensor (for example, an action camera or video camera) that senses light signals in a target area and provides corresponding visual data. The image acquisition device has low costs and has advantages in object height and width measurement accuracy and contour recognition and pedestrian recognition accuracy, and therefore is an indispensable sensor for implementing target classification, logo recognition and the like.

Usually, radar data and visual data are fused to make advantages of two sensors complement each other, to establish a multifunctional control system with capabilities such as sensor fusion sensing, threat terrain warning, threat obstacle highlighting and assisted flight, to realize an all-day, all-weather and all-terrain all-scenario environmental sensing capability of an operator of the unmanned aerial vehicle and provide enough time for timely avoidance of dangerous terrain and obstacles, thereby ensuring safe flight of the unmanned aerial vehicle under any air condition.

"Joint calibration" is a process of determining coordinate conversion relationships among a plurality of different coordinate systems. The joint calibration is used for establishing a correspondence between multi-source data (for example, the radar data and the visual data) and can make the data converted between different coordinate systems, and therefore is a premise of implementing data fusion.

In a traditional joint calibration process of millimeter-wave radar data and image data, adopted data models are all established on the basis of a two-dimensional plane, without considering height-related information of the millimeter-wave radar. However, in some specific use scenarios (for example, the millimeter-wave radar is mounted on the unmanned aerial vehicle), the millimeter-wave radar may change in height, pitch angle and the like with a flight attitude of the unmanned aerial vehicle. The pitch angle may be an included angle between a radar normal direction and a horizontal direction when the millimeter-wave radar works.

Therefore, the traditional data models based on the two-dimensional plane cannot well adapt to such use scenarios. When the attitude of the unmanned aerial vehicle changes, a data model thereof fails, resulting in a problem that there is a large deviation in depth information and the like because the radar data cannot be accurately converted and projected to a coordinate system of the image data.

The applicant found that, by establishing a data entry model based on three-dimensional space, the attitude change of the unmanned aerial vehicle can be adapted without losing data information of the millimeter-wave radar in the height and the pitch angle. By providing calibration parameters that change with the height and the pitch angle, data fusion between the radar data and the visual data can be well implemented.

FIG. 1 is a schematic diagram of an application environment according to an embodiment of the present disclosure. The application environment uses an unmanned aerial vehicle as an example. As shown in FIG. 1, an unmanned aerial vehicle 10 includes: a body 11, arms 12, power apparatuses 13 and a flight controller 14.

The body 11 is a main structure of the unmanned aerial vehicle 10. The body 11 has a suitable volume and shape that meet needs of an actual situation, to provide enough space for accommodating one or more functional modules and components. For example, a plurality of different sensor devices, including but not limited to a detection radar 15 and an image acquisition device 16, may be disposed on the body 11.

In some embodiments, a gimbal that can adjust an inclination angle or another similar structural apparatus may be further disposed on the abdomen of the body 11. Both the detection radar 15 and the image acquisition device 16 are mounted and fixed on the gimbal, so that pitch angles of the detection radar 15 and the image acquisition device 16 can be easily adjusted correspondingly according to a flight height of the unmanned aerial vehicle 10.

In some other embodiments, the sensor devices may further include a height finder radar. The height finder radar is a sensor device configured to accurately detect a ground height of the unmanned aerial vehicle 10. For example, the height finder radar may be an accurate distance detection apparatus of any suitable type, for example, a millimeter-wave radar. Certainly, another similar sensor device such as an altimeter may alternatively be used to detect a current ground height of the unmanned aerial vehicle 10.

The arms 12 are parts of the body 11 extending outward and are used as mounting or fixing structures of the power apparatuses 13, for example, propellers of the unmanned aerial vehicle 10. The arms 12 may be integrally formed with the body 11 or may be connected to the body 11 in a detachable connection form. Typically, on a four-axis unmanned aerial vehicle 10, there may be four arms 12 extending symmetrically along diagonals to form mounting positions of four propellers.

The power apparatuses 13 are structural apparatuses configured to provide power for the unmanned aerial vehicle 10 to fly. For example, the power apparatuses 13 may adopt power and structural design of any suitable type, for example, propellers that are driven by motors and are respectively mounted and fixed on mounting positions of tail ends of the arms 12.

The flight controller 14 is an unmanned aerial vehicle control core built in the body 11. The flight controller 14 may be an electronic device of any type with suitable logical judgment and computing capabilities, including but not limited to a processor chip implemented based on large-scale integrated circuits, an integrated system-on-chip (SOC) and a processor and a storage medium that are connected via a bus. Based on functions (for example, performing a joint calibration method provided in the embodiments of the present disclosure) to be implemented, the flight controller 14 may include a plurality of different functional modules. Such functional modules may be software modules, hardware modules, or modular apparatuses that combine software and hardware and are configured to implement one or more functions.

It should be noted that the embodiments of the present disclosure exemplarily demonstrate an application scenario of the joint calibration method in the unmanned aerial vehicle 10 for sake of simplicity. However, a person skilled in the art may understand that, based on a similar principle, the joint calibration method provided in the embodiments of the present disclosure may alternatively be applied to another application scenario in which a height and a pitch angle of the millimeter-wave radar may change. The inventive idea disclosed in the embodiments of the present disclosure is not limited to the disclosure on the unmanned aerial vehicle 10 shown in FIG. 1.

To fully describe a specific application process of the joint calibration method provided in the embodiments of the present disclosure in an application scenario shown in FIG. 1, construction of an instance of a data entry model based on three-dimensional space is described in detail below with reference to FIG. 2A to FIG. 2C. In this specific instance, the data entry model describes coordinate conversion relationships among a detection radar coordinate system, an image acquisition device coordinate system, a two-dimensional image coordinate system and a two-dimensional pixel coordinate system.

The detection radar coordinate system is a three-dimensional coordinate system that takes a phase center of a transmit antenna as a coordinate origin and meets a right-hand rule. The image acquisition device coordinate system is a three-dimensional coordinate system that takes an optical center of a device as a coordinate origin and meets the right-hand rule. The two-dimensional pixel coordinate system is a two-dimensional coordinate system that takes an upper left corner of an image plane as a coordinate origin, discretized pixels being on coordinate axes. The two-dimensional image coordinate system takes a center of an imaging plane (for example, CCD) as a coordinate origin, coordinate axes thereof being respectively parallel to the coordinate axes of the two-dimensional pixel coordinate system.

Figure 2A:
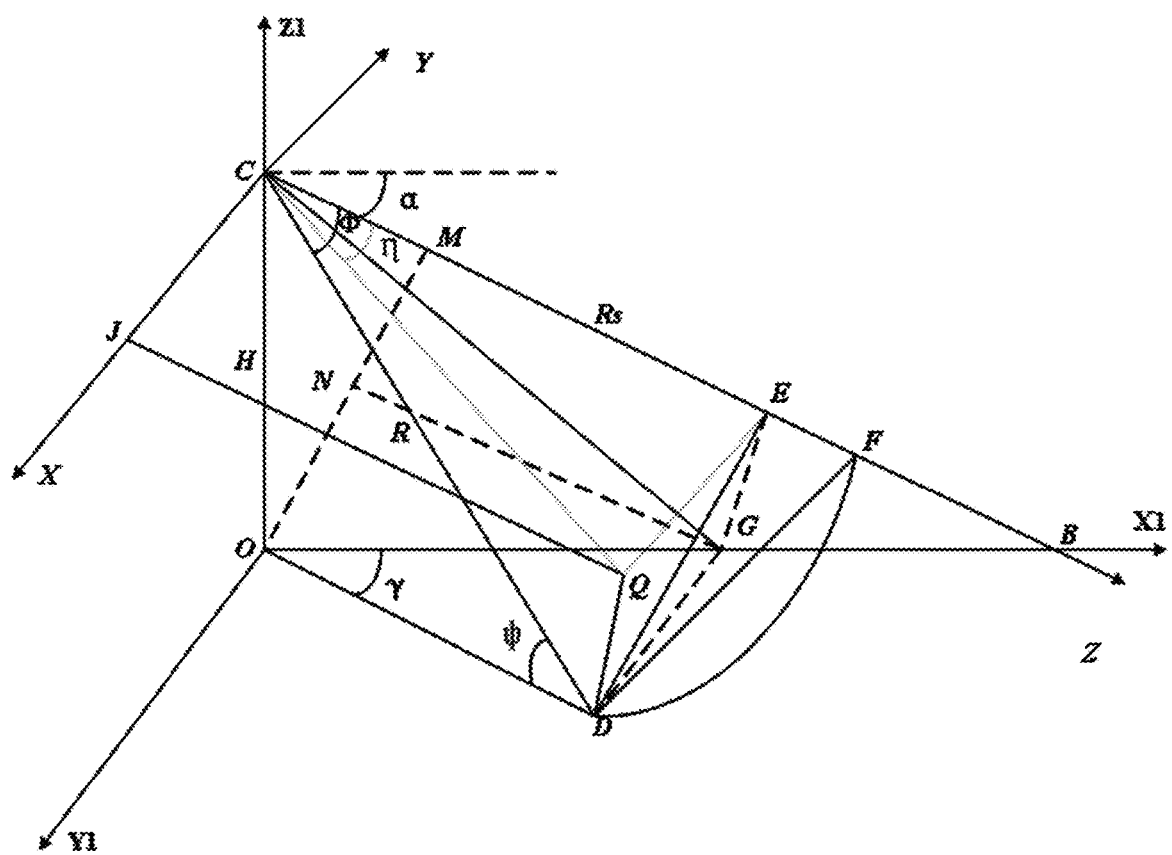
FIG. 2A is a schematic diagram of a coordinate system correspondence according to an embodiment of the present disclosure, which shows a solid geometric relationship between a detection radar coordinate system and a world coordinate system.

First, FIG. 2A is a schematic diagram of a solid geometric relationship between a detection radar coordinate system and a world coordinate system according to an embodiment of the present disclosure, which shows the solid geometric relationship between the detection radar coordinate system and the world coordinate system when a millimeter-wave radar is in a specific height and a specific inclination angle with flight of an unmanned aerial vehicle 10.

As shown in FIG. 2A, D is any point (for example, a detection target) in the three-dimensional space. A coordinate origin of the world coordinate system is O and three coordinate axes thereof are represented as X1, Y1 and Z1 respectively. A coordinate origin of the detection radar coordinate system is C and three coordinate axes thereof are represented as X, Y and Z respectively.

A ground height of a detection radar 15 is H and a pitch angle of the detection radar 15 is $\alpha$ (that is, an included angle between a radar normal direction and a horizontal direction when the millimeter-wave radar works). A distance between the millimeter-wave radar and D is R, Rs is a center slope distance of the millimeter-wave radar, an instantaneous azimuth angle of D relative to the millimeter-wave radar is $\gamma$ and an instantaneous pitch angle of D relative to the millimeter-wave radar is $\psi$. When the detection radar 15 adopts a one-dimensional linear MIMO array for angle detection, a target horizontal angle between the detection radar 15 and D is obtained as $\theta_{radar}$.

1) In FIG. 2A, a straight line DG perpendicular to OB may be drawn through D and a straight line GE perpendicular to CB may be drawn through G. It may be determined that DE is perpendicular to BC combined with three perpendicular line theorems. In a plane formed by points B, C and J, DQ perpendicular to the plane BCJ is drawn. Through such auxiliary line segments, it may be determined that three-dimensional coordinates of D in the detection radar coordinate system may be D=[DG, −GE, CE].

2) Radar detection data of the millimeter-wave radar for D mainly includes a distance between the radar and D and the target horizontal angle between the radar and D. A calculation and detection process of the two pieces of radar detection data is specifically as follows.

2.1) For the distance R, by using a frequency modulated continuous wave (FMCW) radar as an example, the millimeter-wave radar may transmit a FMCW signal. A frequency of the FMCW signal may change linearly in each frequency modulation cycle. When a reflected echo signal is received, digital down-conversion may be first performed on the reflected echo signal, then sample values are sorted into a two-dimensional matrix and then a time-domain echo signal is transformed into a frequency-domain dimension through two-dimensional (2-D) fast Fourier transform (FFT), to obtain a two-dimensional Doppler matrix (RDM) corresponding to a to-be-detected target and obtain a target distance R of the to-be-detected target combined with a constant false alarm detection (CFAR) algorithm.

2.2) For the target horizontal angle, by using a two-dimensional DOA (Direction Of Arrival) estimation algorithm as an example, a specific detection process is as follows.

It is assumed that for D, there is a radar array formed by N antennas and an antenna element distance is that d=λ/2, λ being a wavelength. It is assumed that an angle position of D relative to the radar in the three-dimensional space is (γ, ψ), that γ∈(−π/2, π/2) and that ψ∈(0, π/2) respectively representing an instantaneous azimuth angle and an instantaneous pitch angle corresponding to any point target. In this case, a signal vector s for estimating a direction of arrival (DOA) may be represented by the following formula (1-1):

$$s = A \cdot \alpha(\gamma, \psi) \quad (1\text{-}1)$$

A represents a scattering coefficient of any point target. α(γ, ψ) represents a signal steering vector and may be represented by the following formula (1-2):

$$\alpha(\gamma,\psi) = [1, e^{-j2\pi d \sin\gamma \cos\psi/\lambda}, \ldots, e^{-j2\pi(N-1)d \sin\gamma \cos\psi/\lambda}]^H \quad (1\text{-}2)$$

For one-dimensional DOA estimation, a steering vector only considering an azimuth angle may be represented as:

$$b = [1, e^{-j2\pi d \sin\gamma/\lambda}, \ldots, e^{-j2\pi(N-1)d \sin\gamma/\lambda}]^H \quad (1\text{-}3)$$

Therefore, an azimuth estimation angle may be obtained by using the following formula (1-4):

$$\hat{\gamma}_{traditional} = \arg\max_{\gamma} |b^H s| \quad (1\text{-}4)$$

After the target distance R and a target height difference H are determined, as shown in FIG. 2A, the instantaneous pitch angle between the detection radar 15 and the any point target D may be represented by the following formula (1-5):

$$\hat{\psi} = a\sin\left(\frac{H}{R}\right) \quad (1\text{-}5)$$

Therefore, it is considered that an azimuth steering vector corresponding to a pitch angle caused by a height may be represented by the following formula (1-6):

$$\alpha(\gamma,\hat{\psi}) = [1, e^{-j2\pi d \sin\gamma \cos\hat{\psi}/\lambda}, \ldots, e^{-j2\pi(N-1)d \sin\gamma \cos\hat{\psi}/\lambda}]^H \quad (1\text{-}6)$$

d is an even antenna element distance, N is a quantity of receive antennas and [ ]$^H$ represents a transposed conjugate of a matrix. In this case, through the DOA estimation, the target horizontal angle is obtained as:

$$\theta_{radar} = \arg\max_{\gamma} |a^H(\gamma, \hat{\psi})s| \quad (1\text{-}7)$$

3) With reference to the steering vector expression derived through the foregoing steps, when the radar adopts the one-dimensional linear MIMO array for angle detection, an angle between the radar and the to-be-detected target D is $\theta_{radar}$. With reference to the geometric relationship in FIG. 2A, it may be determined that there is the following formula (2-1):

$$\sin \angle \theta_{radar} = \cos \angle DCQ * \sin \angle QCE \quad (2\text{-}1)$$

3.1) According to a folding angle formula in solid geometry, it may be determined that different angles meet the following formula (2-2):

$$\cos \angle DCE = \cos \angle QCE * \cos \angle DCQ \quad (2\text{-}2)$$

3.2) Combined with the formula (2-1) and the formula (2-2), the following formula (3) may be obtained by simplification:

$$\tan \angle QCE = \frac{\sin \angle \theta_{radar}}{\cos \angle DCE} \quad (3)$$

3.2) With reference to the geometric relationship in FIG. 2A, the foregoing formula (3) may be further simplified as the following formula (4):

$$QE = DG = R \sin \angle \theta_{radar} \quad (4)$$

3.3) With reference to the geometric relationship in FIG. 2A, an included angle between OB and OD meets the following formula (5):

$$\sin\gamma = \frac{DG}{\sqrt{R^2 - H^2}} \quad (5)$$

3.4) With reference to the geometric relationship in FIG. 2A, CE may be calculated by using the following formula (6):

$$CE = H \sin\alpha + OG \cos\alpha \quad (6)$$

3.5) By using a principle of similar triangles, it may be determined that a ratio among line segments meets the following formula (7):

$$GE = \frac{BE * OC}{OB} \quad (7)$$

BE may be obtained by subtracting CE from Rs.

Therefore, based on the radar data and pose information detected by the detection radar 25, the three-dimensional coordinates of the any point D in the three-dimensional space in the detection radar coordinate system may be shown in the following formula (8):

$$\left[ R\sin\angle\theta_{radar}, -\frac{BE * OC}{OB}, H\sin\alpha + OG\cos\alpha \right] \quad (8)$$

As shown in the formula (8), when the data entry model determines three-dimensional coordinates of a target in the detection radar coordinate system based on radar detection data of the target, two parameters, namely, the ground height H and the pitch angle α, of the detection radar 15 are introduced, so that a situation of the detection radar 15 when the ground height and the pitch angle change can be better reflected.

Second, a coordinate conversion relationship between the detection radar coordinate system and the image acquisition device coordinate system may be represented through a constructed orthogonal rotation matrix and a three-dimensional translation vector. The coordinate conversion relationship between the detection radar coordinate system and the image acquisition device coordinate system may be represented by the following formula (9):

$$\begin{pmatrix} X_c \\ Y_c \\ Z_c \\ 1 \end{pmatrix} = \begin{pmatrix} R & t \\ 0^T & 1 \end{pmatrix} \begin{pmatrix} X_r \\ Y_r \\ Z_r \\ 1 \end{pmatrix} \quad (9)$$

$(X_r, Y_r, Z_r)$ represents coordinate positions in the detection radar coordinate system, $(X_c, Y_c, Z_c)$ represents coordinate positions in the image acquisition device coordinate system, R is the orthogonal rotation matrix and t is the three-dimensional translation vector. The three-dimensional translation vector and the orthogonal rotation matrix may be shown in the following formulas (9-1) and (9-2) respectively:

$$t = (X_t \quad Y_t \quad Z_t)^T \quad (9-1)$$

$$R = \begin{pmatrix} 1 & 0 & 0 \\ 0 & \cos\theta & -\sin\theta \\ 0 & \sin\theta & \cos\theta \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} \cos\vartheta & -\sin\vartheta & 0 \\ \sin\vartheta & \cos\vartheta & 0 \\ 0 & 0 & 1 \end{pmatrix} \quad (9-2)$$

When it is known that a plurality of three-dimensional space sample points are in the detection radar coordinate system and the image acquisition device coordinate system, three-dimensional rotation angles in the orthogonal rotation matrix and translations in the three-dimensional translation vector may be calculated and determined in any suitable manner, so that the coordinate conversion relationship between the detection radar coordinate system and the image acquisition device coordinate system is obtained.

It should be noted that specific methods for calculating and determining the orthogonal rotation matrix and the three-dimensional translation vector are well known to a person skilled in the art. Details are not described herein.

Figure 2B:
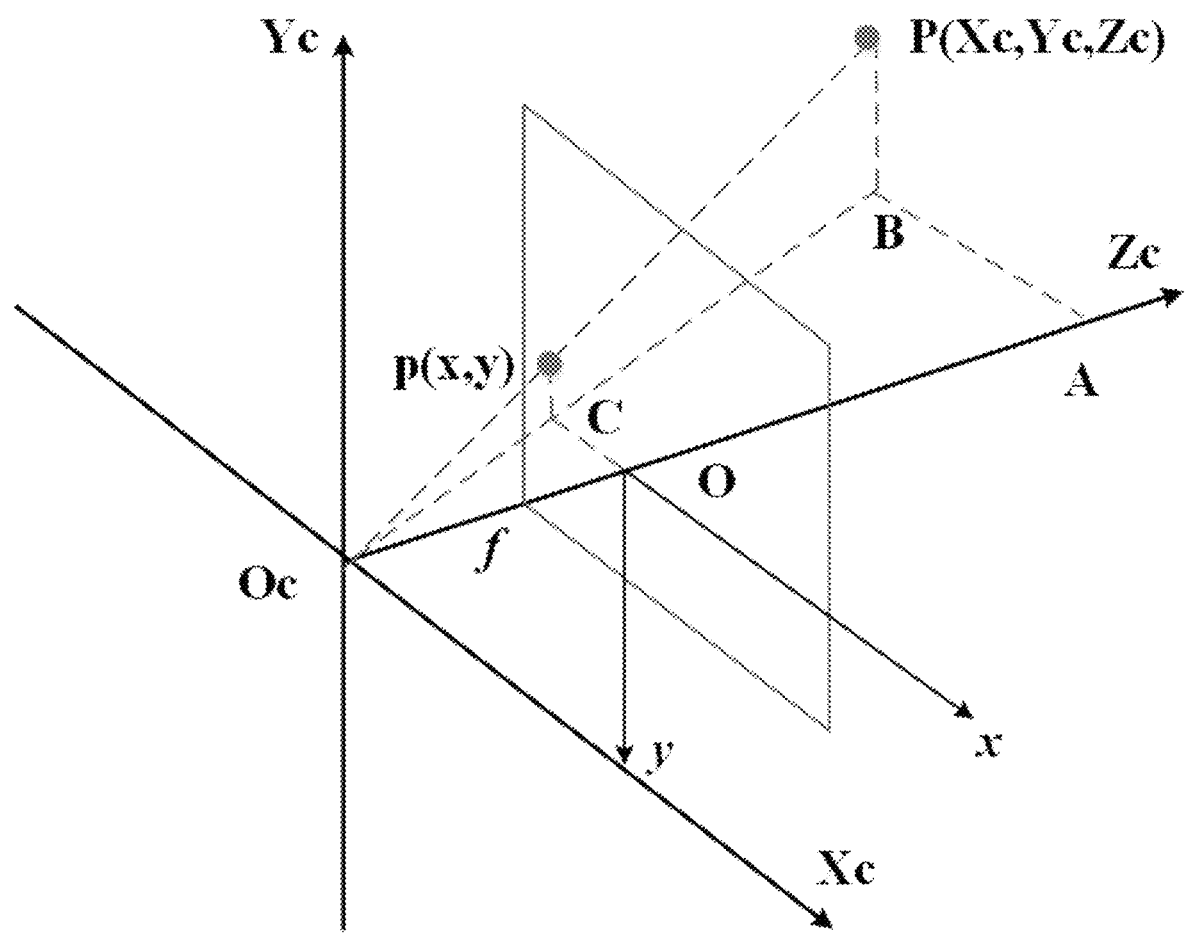
FIG. 2B is a schematic diagram of a coordinate system correspondence according to an embodiment of the present disclosure, which shows a situation in which an image acquisition device coordinate system is converted from a three-dimensional projection to a two-dimensional coordinate system.

Then, FIG. 2B is a schematic diagram of a projection relationship between an image acquisition device coordinate system and a two-dimensional image coordinate system according to an embodiment of the present disclosure, which shows a situation in which the image acquisition device coordinate system is converted from a three-dimensional projection to a two-dimensional coordinate system.

As shown in FIG. 2B, a coordinate origin of the image acquisition device coordinate system is $O_c$ and three coordinate axes thereof are represented as $X_c$, $Y_c$ and $Z_c$ respectively. A coordinate origin of the two-dimensional image coordinate system is O and two coordinate axes thereof are represented as x and y respectively. P is any point in the image acquisition device coordinate system and p is a projection of P onto an imaging plane.

1.1) In FIG. 2B, a triangle enclosed by points $O_c$, C and p and a triangle enclosed by points $O_c$, B and P are similar triangles. A triangle enclosed by points $O_c$, C and O and a triangle enclosed by points $O_c$, B and A are also similar triangles. Therefore, the following formula (10) may be obtained:

$$\frac{CO}{AB} = \frac{OO_c}{AO_c} = \frac{pC}{PB} = \frac{x}{X_c} = \frac{f}{Z_c} = \frac{y}{Y_c} \quad (10)$$

f is a focal length, coordinates of P in the image acquisition device coordinate system are represented as $(X_c, Y_c, Z_c)$ and coordinates of p in the two-dimensional image coordinate system are represented as (x, y).

1.2) After the formula (10) is converted, coordinate data of p as shown in the following formula (11) may be obtained:

$$\begin{cases} x = f \dfrac{X_c}{Z_c} \\ y = f \dfrac{Y_c}{Z_c} \end{cases} \quad (11)$$

1.3) By sorting out the formula (10), a coordinate conversion relationship between the image acquisition device coordinate system and the two-dimensional image coordinate system may be obtained as shown in the following formula (12):

$$Z_c \begin{pmatrix} x \\ y \\ 1 \end{pmatrix} = \begin{pmatrix} f & 0 & 0 \\ 0 & f & 0 \\ 0 & 0 & 1 \end{pmatrix} \begin{pmatrix} X_c \\ Y_c \\ Z_c \end{pmatrix} \quad (12)$$

Finally, coordinate data in the two-dimensional image coordinate system obtained through conversion of the formula (12) usually adopts a similar length unit such as mm, rather than discrete pixel points. However, when a commonly used image acquisition device 16 (such as a digital camera) acquires an image, a standard electrical signal is first formed and is then converted to a digital image through digital-to-analog conversion. A storage form of each acquired image is an M×N array. A value of each element in the image of M rows and N columns represents a grayscale of the image. Therefore, a coordinate conversion relationship between the two-dimensional image coordinate system and the two-dimensional pixel coordinate system may be further determined, to complete data fusion of radar data and image data.

Figure 2C:
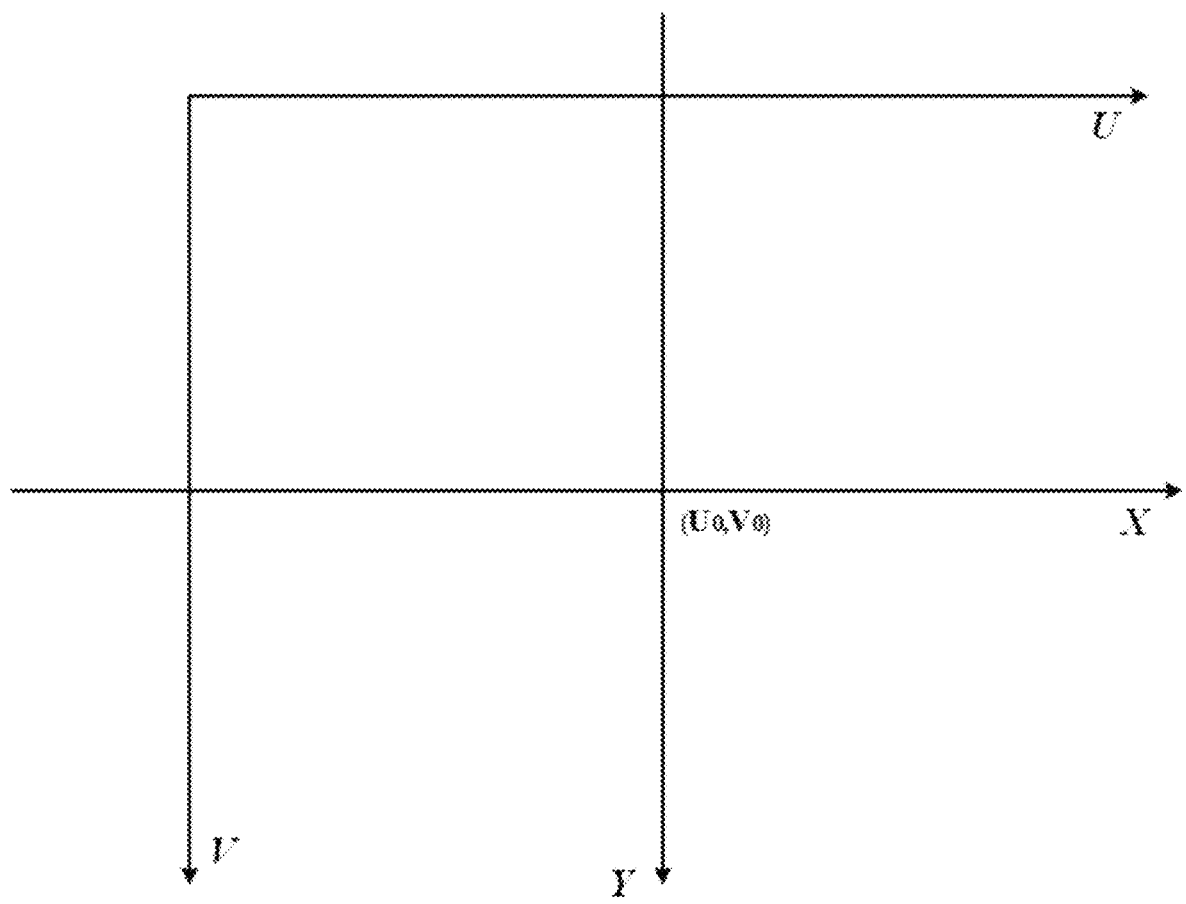
FIG. 2C is a schematic diagram of a coordinate system correspondence according to an embodiment of the present disclosure, which shows a correspondence between a two-dimensional image coordinate system and a two-dimensional pixel coordinate system.

FIG. 2C is a schematic diagram of a correspondence between a two-dimensional image coordinate system and a two-dimensional pixel coordinate system according to an embodiment of the present disclosure. As shown in FIG. 2C, the two-dimensional image coordinate system takes a center of an image plane as a coordinate origin and two coordinate axes thereof are respectively parallel to two perpendicular edges of the image plane and are represented by using X and Y respectively. Coordinates in the two-dimensional image coordinate system may be represented by using (x, y) and is measured by mm.

The two-dimensional pixel coordinate system takes a vertex in an upper left corner of an image plane as an origin and two coordinate axes thereof are respectively parallel to the X axis and the Y axis of the two-dimensional image coordinate system and are represented by using U and V respectively. Coordinates in the two-dimensional pixel coordinate system may be represented by using (u, v).

By setting that one pixel is equal to d mm, the coordinate conversion relationship between the two-dimensional image coordinate system and the two-dimensional pixel coordinate system may be shown in the following formula (13):

$$\begin{cases} u = \dfrac{x}{dx} + u_0 \\ v = \dfrac{y}{dy} + v_0 \end{cases} \quad (13)$$

$(u_o, v_o)$ is coordinates of the coordinate origin of the two-dimensional image coordinate system in the two-dimensional pixel coordinate system. Further, the formula (13) may be sorted out, to obtain the coordinate conversion relationship shown in a formula (14):

$$\begin{pmatrix} u \\ v \\ 1 \end{pmatrix} = \begin{pmatrix} \dfrac{1}{dx} & 0 & u_0 \\ 0 & \dfrac{1}{dy} & v_0 \\ 0 & 0 & 1 \end{pmatrix} \begin{pmatrix} x \\ y \\ 1 \end{pmatrix} \quad (14)$$

Therefore, based on the specific instance of the foregoing data entry model, any point located in the three-dimensional space may be converted from the detection radar coordinate system to the pixel coordinate system by using the following formula (15), to implement data fusion of image data and radar data. The formula (15) is obtained by combining the foregoing formula (9), formula (12) and formula (14).

$$Z_c \begin{pmatrix} u \\ v \\ 1 \end{pmatrix} = \begin{pmatrix} \dfrac{1}{dx} & 0 & u_0 \\ 0 & \dfrac{1}{dy} & v_0 \\ 0 & 0 & 1 \end{pmatrix} \begin{pmatrix} f & 0 & 0 \\ 0 & f & 0 \\ 0 & 0 & 1 \end{pmatrix} \begin{pmatrix} X_c \\ Y_c \\ Z_c \end{pmatrix} = \begin{pmatrix} f\dfrac{1}{dx} & 0 & u_0 \\ 0 & f\dfrac{1}{dy} & v_0 \\ 0 & 0 & 1 \end{pmatrix} \begin{pmatrix} X_c \\ Y_c \\ Z_c \end{pmatrix}$$

$$= \begin{pmatrix} f\dfrac{1}{dx} & 0 & u_0 \\ 0 & f\dfrac{1}{dy} & v_0 \\ 0 & 0 & 1 \end{pmatrix} (R \; t) \begin{pmatrix} X_r \\ Y_r \\ Z_r \end{pmatrix} = K * T * \begin{pmatrix} X_r \\ Y_r \\ Z_r \end{pmatrix} \quad (15)$$

A person skilled in the art may understand that, in the foregoing formula (15), K is an intrinsic parameter of the image acquisition device 16. A specific method for obtaining K is well known to a person skilled in the art and K may be determined by a calibration method such as a Zhang Zhengyou calibration method. Details are not described herein. T is a calibration parameter related to the height and the pitch angle of the detection radar 15 and changes with the height and the pitch angle of the detection radar 15.

It should be noted that the specific instance of the data entry model provided in the embodiments of the present disclosure is only used to describe how to introduce height information and pitch angle information of the detection radar 15 into the coordinate conversion relationship between the detection radar coordinate system and the two-dimensional pixel coordinate system, which are not intended to limit the scope of the present disclosure. According to an actual situation such as a practical need or a characteristic of a specific use scenario, a person skilled in the art easily thinks of adjusting, replacing or changing one or more of steps and parameters, to obtain another data entry model through reasonable derivation.

One of advantages of the data entry model provided in the embodiments of the present disclosure is: impact of an attitude change of a detection radar in three-dimensional space is considered and a problem that the data entry model fails because a height and a pitch angle change in a scenario such as disclosure of an unmanned aerial vehicle is effectively resolved.

Figure 3:
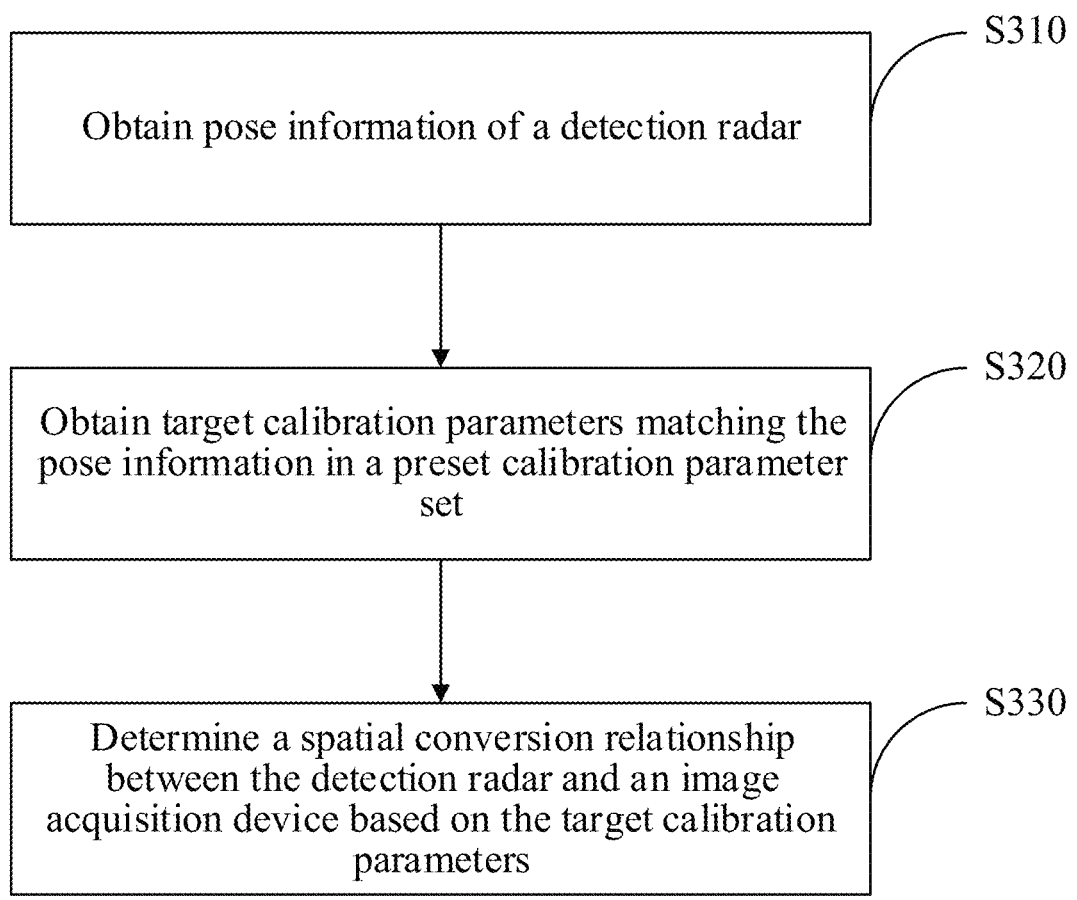
FIG. 3 is a method flowchart of a joint calibration method according to an embodiment of the present disclosure.

Embodiments of the present disclosure further provide a joint calibration method. The joint calibration method is set based on the data entry model that introduces an attitude change of a detection radar 15. FIG. 3 shows a joint calibration method according to an embodiment of the present disclosure. As shown in FIG. 3, the joint calibration method includes the following steps.

S310: Obtain pose information of a detection radar.

The pose information may include a ground height of the detection radar 15 and a pitch angle of the detection radar 15. In actual operation, by using the application scenario shown in FIG. 1 as an example, the ground height of the detection radar 15 fixed on a gimbal of an unmanned aerial vehicle 10 is a flight height of the unmanned aerial vehicle 10, which may be obtained by detection of a sensor device of the unmanned aerial vehicle 10, for example, a height finder radar, a GPS module or an altitude sensor. The pitch angle of the detection radar 15 may be determined by reading an inclination angle of the gimbal of the unmanned aerial vehicle 10. In a preferable embodiment, the ground height of the detection radar 15 may be obtained by adopting a height finder radar with high detection accuracy to detect. For example, the detection radar 15 may be a millimeter-wave radar that can obtain depth information of an object.

S320: Obtain target calibration parameters matching the pose information in a preset calibration parameter set.

The "calibration parameter set" is a data set formed by a plurality of calibration parameters. The calibration parameter set may be stored and invoked in any suitable data form, for example, may be stored in a specific non-volatile storage medium in a form of a parameter table. In the calibration parameter set, one or more calibration parameters matching a specific pose information interval may be referred to as a group of calibration parameters. Calibration parameters specifically included in each group of calibration parameters may be set according to needs of an actual situation.

Corresponding to step S310, the pose information interval may similarly include a height interval and a pitch angle interval. In this embodiment, an "interval" is a specific numerical range. A specific numerical range size, division manner and the like thereof may be set according to needs of an actual situation.

The "target calibration parameters" are a group of calibration parameters matching current pose information of the detection radar 15. In actual operation, a pose information interval of the detection radar 15 may be determined according to the current pose information of the detection radar 15. Then, in any suitable manner in the calibration parameter set, calibration parameters matching the pose information interval are searched and obtained as the target calibration parameters.

In some embodiments, data of the foregoing calibration parameter set may be stored in storage space of a controller of the unmanned aerial vehicle 10 and is directly invoked by a corresponding processor when needed. In some other embodiments, the calibration parameter set may alternatively be stored in another server that has a communication connection with the unmanned aerial vehicle 10 or a non-volatile storage medium. Required target calibration parameters are provided for the controller of the unmanned aerial vehicle 10 through a wireless communication connection channel.

S330: Determine a spatial conversion relationship between the detection radar and an image acquisition device 16 based on the target calibration parameters.

The "spatial conversion relationship" is a correspondence between the detection radar 15 and the image acquisition device 16 in space. The spatial conversion relationship may be represented by one or more rotation matrices or other similar manners, so that radar data obtained by the detection radar 15 and/or visual data obtained by the image acquisition device 16 can be converted among a plurality of different coordinate systems, to complete data fusion.

By using the specific instance of the foregoing data entry model as an example, the foregoing spatial conversion relationship may include: a coordinate correspondence between radar detection data of a target and three-dimensional coordinates of the target in a detection radar coordinate system, a first coordinate conversion relationship between the detection radar coordinate system and an image acquisition device coordinate system, a second coordinate conversion relationship between the image acquisition device coordinate system and a two-dimensional image coordinate system and a third coordinate conversion relationship between the two-dimensional image coordinate system and a two-dimensional pixel coordinate system.

As shown in FIG. 2A and the formula (8), the coordinate correspondence is a function related to the ground height and the pitch angle of the detection radar 15. Under a specific ground height and pitch angle, a distance R of the target and a target horizontal angle $\theta_{radar}$ that are obtained based on detection of the millimeter-wave radar may be correspondingly converted to obtain the three-dimensional coordinates of the target in the detection radar coordinate system.

In other words, changes of the ground height and the pitch angle of the detection radar 15 cause the three-dimensional coordinates of the same target in the detection radar coordinate system to change. Through such a manner, attitude change information of the detection radar 15 is also introduced into the model, which can more accurate data fusion between the radar data obtained by the detection radar 15 and image data.

In addition, the first coordinate conversion relationship may be represented by the formula (9), the second coordinate conversion relationship may be represented by the formula (12) and the third coordinate conversion relationship may be represented by the formula (14). By integrating the first coordinate conversion relationship, the second coordinate conversion relationship and the third coordinate conversion relationship, a spatial conversion function between the detection radar coordinate system and the two-dimensional pixel coordinate system may be obtained as shown in the formula (15).

One of advantages of the joint calibration method provided in this embodiment of the present disclosure is: calibration parameters may be correspondingly corrected according to a change of pose information of a detection radar 15, to obtain an accurate spatial conversion relationship matching a current position of the detection radar 15. Based on the spatial conversion relationship, radar data obtained by the detection radar 15 can be easily converted in a two-dimensional pixel coordinate system, to implement data fusion between depth information and multi-source data such as image visual data.

Figure 4:
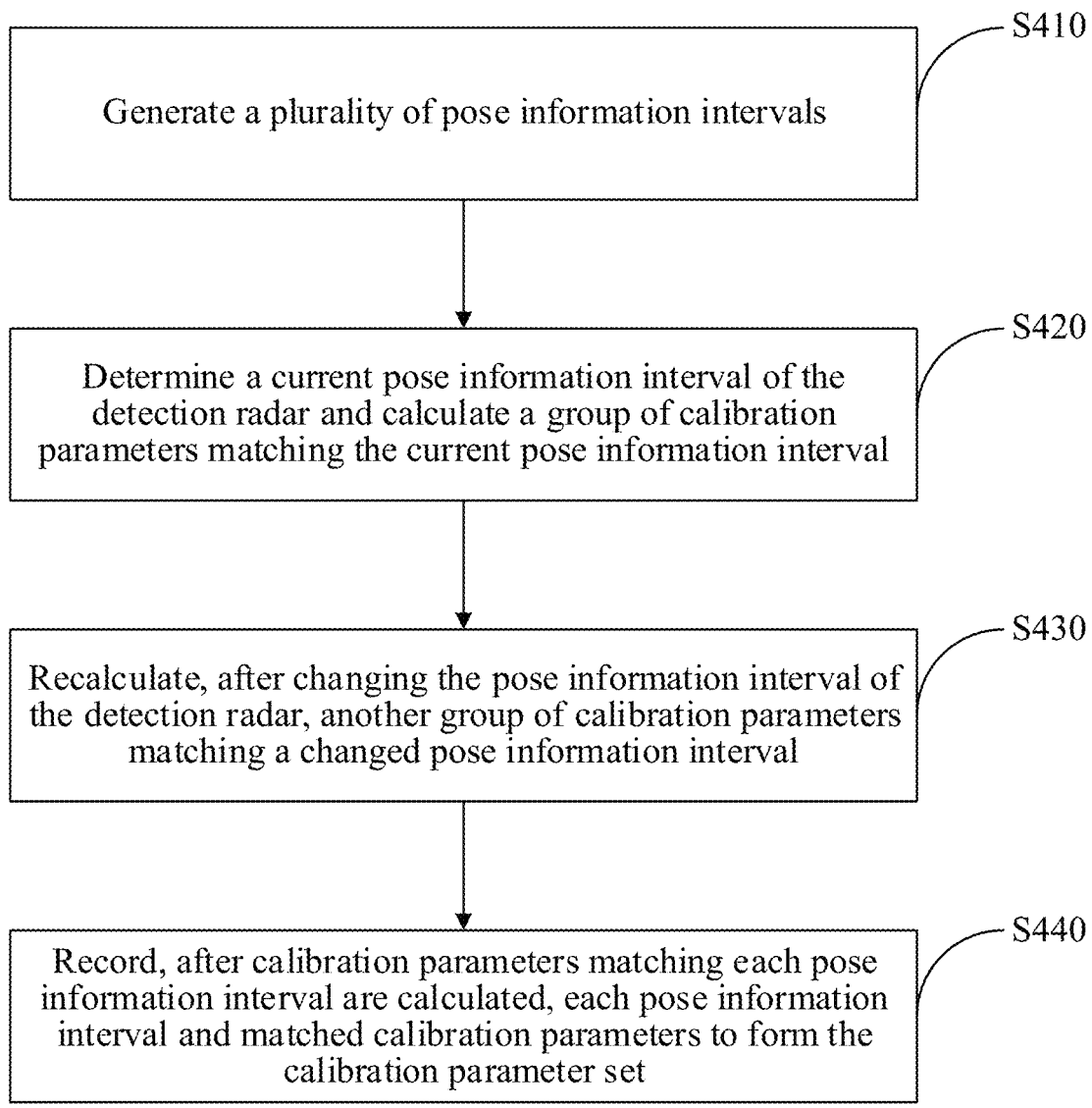
FIG. 4 is a method flowchart of forming a calibration parameter set according to an embodiment of the present disclosure.

The calibration parameter set in this embodiment of the present disclosure is data information that is pre-established and obtained through a series of method steps and is stored in a flight controller 14 of the unmanned aerial vehicle 10 to be invoked by the flight controller 14 at any time in a data fusion process. FIG. 4 shows a method for constructing a calibration parameter set according to an embodiment of the present disclosure. As shown in FIG. 4, the method for constructing a calibration parameter set includes the following steps.

S410: Generate a plurality of pose information intervals.

Each pose information interval may be an interval jointly defined by two different items, namely, a height interval and a pitch angle interval. For example, a suitable quantity of pose information intervals may be generated according to needs of an actual situation.

In some embodiments, the method of generating a plurality of pose information intervals may further include: first, dividing a preset ground height range into m continuous height intervals and dividing a preset pitch angle range into n continuous pitch angle intervals; and then, combining each height interval with the n pitch angle intervals respectively, to generate m*n different pose information intervals.

The preset ground height range may be from zero to a highest flight height of the unmanned aerial vehicle 10. The pitch angle range may be determined by the gimbal of the unmanned aerial vehicle 10. Both m and n are positive integers and may be set or adjusted according to an actual situation (for example, a size of the ground height range).

S420: Determine a current pose information interval of the detection radar and calculate a group of calibration parameters matching the current pose information interval.

The spatial conversion relationship between the detection radar 15 and the image acquisition device 16 when the detection radar 15 is in a specific position may be derived and determined through a plurality of pieces of known test data based on the established data entry model, to calculate and determine the corresponding calibration parameters.

In some embodiments, calculation of the calibration parameters may be derived and determined through some pieces of known test coordinate data. First, a plurality of pieces of test coordinate data under the pose information are obtained. Then, through the test coordinate data, to-be-determined parameters in a preset spatial conversion function are calculated and determined as the calibration parameters.

The preset spatial conversion function is configured to represent the spatial conversion relationship between the detection radar 15 and the image acquisition device 16. In this embodiment, the preset "spatial conversion function" and the "spatial conversion relationship" may have a same expression or similar expressions and a difference between the two is that the spatial conversion function has a plurality of to-be-determined parameters. In other words, when parameter values of all to-be-determined parameters are determined, by substituting such parameter values, the required spatial conversion relationship may be obtained based on the spatial conversion function.

Test coordinate data is related to an actually used spatial conversion function (or spatial conversion relationship). For example, when the spatial conversion relationship between the detection radar 15 and the image acquisition device 16 includes the coordinate conversion relationship between the detection radar coordinate system and the two-dimensional pixel coordinate system, the test coordinate data may include first coordinate data of a test point in the detection radar coordinate system and second coordinate data of the same test point in the two-dimensional pixel coordinate system.

S430: Recalculate, after changing the pose information interval of the detection radar 25, another group of calibration parameters matching a changed pose information interval.

The pose information of the detection radar 15 is changed to another new pose information interval and step S420 is performed again to obtain the calibration parameters matching the pose information interval. In actual operation, the foregoing step S420 and step S430 may be performed in a simulated environment built by a computer, to rapidly obtain required calibration parameter information.

S440: Record, after calibration parameters matching each pose information interval are calculated, each pose information interval and matched calibration parameters to form the calibration parameter set.

Through performing step S420 and step S430 for a plurality of times, the calibration parameters matching each pose information interval can be determined. Matching relationships between such calibration parameters and the pose information interval may be recorded and saved in any suitable manner, to form the calibration parameter set that needs to be used.

Figure 5:
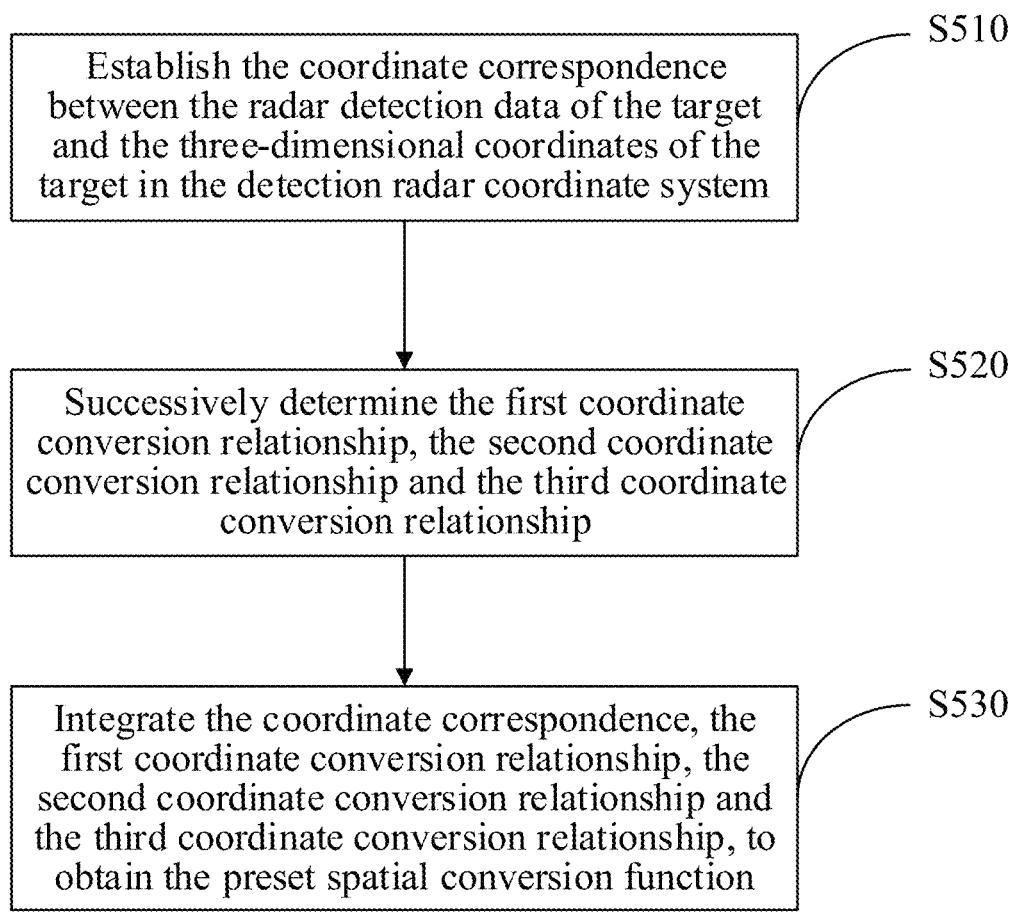
FIG. 5 is a method flowchart of obtaining a preset spatial conversion function according to an embodiment of the present disclosure.

In some embodiments, by using the specific instance of the foregoing data entry model as an example, as shown in FIG. 5, specific steps of obtaining the spatial conversion function may include the following steps.

S510: Establish the coordinate correspondence between the radar detection data of the target and the three-dimensional coordinates of the target in the detection radar coordinate system.

The coordinate correspondence is a three-dimensional coordinate expression related to the ground height and the pitch angle. The coordinate correspondence may represent the three-dimensional coordinates of the target by using a distance between the detection radar 25 and the target and a target horizontal angle between the detection radar 15 and the target.

As shown in FIG. 2A and the formula (8), the coordinate correspondence may be shown in the following formula:

$$\begin{cases} X_r = R\sin\angle\theta_{radar} \\ Y_r = -\dfrac{BE * OC}{OB} \\ Z_r = H * \sin\alpha + OG * \cos\alpha \end{cases}$$

The coordinates of the target in the detection radar coordinate system being $(X_r, Y_r, Z_r)$, R being the distance between the target and the detection radar 15, O being a coordinate origin of a world coordinate system, B being an intersection between a z axis of the detection radar coordinate system and an x axis of the world coordinate system, C being a coordinate origin of the detection radar coordinate system, G being an intersection between a perpendicular line passing through the target and the x axis of the world coordinate system, E being an intersection between a perpendicular line passing through G and the z axis of the detection radar coordinate system, H being the ground height of the detection radar 15, α being the pitch angle of the detection radar 15 and $\theta_{radar}$ being the target horizontal angle between the detection radar 15 and the target.

S520: Successively determine the first coordinate conversion relationship between the detection radar coordinate system and the image acquisition device 16 coordinate system, the second coordinate conversion relationship between the image acquisition device coordinate system and the two-dimensional image coordinate system and the third coordinate conversion relationship between the two-dimensional image coordinate system and the two-dimensional pixel coordinate system.

The first coordinate conversion relationship, the second coordinate conversion relationship and the third coordinate conversion relationship are shown in the formula (9), the formula (12) and the formula (14) respectively. Herein, "first", "second" and "third" are only used to distinguish coordinate conversion relationships among different coordinate systems and are not used to limit specific aspects such as expression manners thereof.

S530: Integrate the coordinate correspondence, the first coordinate conversion relationship, the second coordinate conversion relationship and the third coordinate conversion relationship, to obtain the preset spatial conversion function.

In this embodiment, the term "integration" is used to indicate one or more data operation operations that combine a plurality of conversion relationships with a plurality of three-dimensional coordinate expressions and perform corresponding simplification and/or sorting. Specific mathematical operations are not specifically limited herein and may be adjusted or set according to needs of an actual situation, as long as a correspondence between the target in the detection radar coordinate system and the target in the two-dimensional pixel coordinate system can be determined.

In some other embodiments, to adapt to different application scenarios or changes in actual situations, the data of the foregoing calibration parameter set may further include an updating step. A refreshing operation may be performed on the calibration parameter set when the calibration parameter set is updated. Then, according to current pose information of the detection radar 15, the calibration parameter set is traversed, to obtain a group of calibration parameters matching the current pose information.

To fully described the method for constructing the calibration parameter set in this embodiment of the present disclosure, the following uses the data entry model shown in the formula (15) as an example to describe in detail a specific process of constructing the calibration parameter set based on the data entry model.

1) Divide continuous height intervals.

First, a division step value of the height intervals and the ground height range are set.

The division step value is an empirical value, which may be set or adjusted by technical personnel according to needs of an actual situation. Preferably, the used division step value may be appropriately expanded to reduce a quantity of divided height intervals and reduce adjustment parameters of an extrinsic parameter. The ground height range may be set according to an actual situation such as a flight height range of the unmanned aerial vehicle 10 when normally working, which is not specifically limited herein.

Then, the ground height range is divided into m height intervals according to the following formula (16-1):

$$H_m = \text{ceil}\left(\dfrac{H_{max} - H_{min}}{\Delta H}\right) \qquad (16\text{-}1)$$

A subscript m is a sequence number of the height interval, ceil is rounding up, $H_{max}$ is an upper limit value of the ground height range, $H_{min}$ is a lower limit value of the ground height range and $\Delta H$ is the division step value.

2) Divide continuous pitch angle intervals.

First, a division step value of the pitch angle intervals and the pitch angle range are set.

The division step value of the pitch angle intervals is similar to the division step value of the height intervals and is also an empirical value, which may be set or adjusted by technical personnel according to needs of an actual situation. The pitch angle range is set according to a pitch angle range within which the gimbal may adjust when the unmanned aerial vehicle 10 normally works, which is not specifically limited herein. Preferably, a larger pitch angle range may be selected and set to cover extreme situations in a flight process of the unmanned aerial vehicle 10 as much as possible, to ensure correctness of the calibration parameters.

Then, the pitch angle range is divided into n pitch angle intervals according to the following formula (16-2):

$$\alpha_n = \text{ceil}\left(\frac{\alpha_{max} - \alpha_{min}}{\Delta\alpha}\right) \tag{16-2}$$

A subscript n is a sequence number of the pitch angle interval, ceil is rounding up, $\alpha_{max}$ is an upper limit value of the pitch angle range, $\alpha_{min}$ is a lower limit value of the pitch angle range and $\Delta\alpha$ is the division step value.

Therefore, by combining the m height intervals and the n pitch angle intervals that are obtained through the foregoing division, the m*n pose information intervals may be formed.

3) Calculation of the calibration parameters.

Assuming that for a test target in space, it is known that coordinates of the test target in the two-dimensional pixel coordinate system are p and coordinates of the test target in the detection radar coordinate system are q, the foregoing formula (15) may be sorted out and transformed into the following formula (17):

$$p = K[R\ t]q \tag{17}$$

K is an intrinsic parameter that does not change with the height and the pitch angle of the detection radar 15 and may be obtained by calibrating the image acquisition device 16 in a manner such as a Zhang Zhengyou calibration method. R and t are calibration parameters that need to be determined.

As described in the foregoing data entry model, there are totally six items of calibration parameters that need to be solved and determined in R and t, which are specifically shown in the following formula (18):

$$w = [\theta_x, \theta_y, \theta_z, t_x, t_y, t_z] \tag{18}$$

$\theta_x$, $\theta_y$ and $\theta_z$ are respectively rotation angles of coordinate axes and $t_x$, $t_y$ and $t_z$ are respectively movement amounts of the coordinate axes in corresponding directions.

Based on a plurality of groups of known coordinates p and q that correspond to each other, the foregoing six items of calibration parameters are determined by solving a nonlinear optimal solution of a constraint function shown in the following formula (19), to be used as a group of calibration parameters matching a pose information interval.

$$\underset{w}{\text{argmin}} \sum_{i=1}^{N} \|\tilde{q}_i - K[R\ t]\tilde{p}_i\|_2^2 \tag{19}$$

p is coordinate data of the test point in the two-dimensional pixel coordinate system, q is coordinate data of the test point in the detection radar coordinate system, K is the intrinsic parameter of the image acquisition device, R is the orthogonal rotation matrix and t is the three-dimensional translation vector.

4) Generate the calibration parameter set.

By changing the height and the pitch angle of the detection radar 15 for a plurality of times and repeating step 3), all m*n pose information intervals and a group of calibration parameters matching each pose information interval can be obtained through traversal. A plurality of groups of calculated calibration parameters and corresponding matching relationships between the plurality of groups of calibration parameters and the pose information intervals may be recorded by a calibration parameter table shown in FIG. 6.

As shown in FIG. 6, $H_m$ represents a height interval within which a current ground height of the detection radar 15 is, $\alpha_n$ represents a pitch angle interval within which a current pitch angle of the detection radar 15 is and $[R_{mn}\ t_{mn}]$ represents a group of calibration parameters matching the height interval $H_m$ and the pitch angle interval $\alpha_n$.

During actual application, the foregoing step 1) to step 4) for generating the calibration parameter set may be performed in a simulated environment pre-built in an electronic computing platform, to obtain the calibration parameter table shown in FIG. 6. In some embodiments, the calibration parameter table is stored and recorded in a local storage medium of the unmanned aerial vehicle 10. Certainly, the calibration parameter table may alternatively be stored in another remotely located memory and is not limited to the local storage medium of the unmanned aerial vehicle 10.

When data fusion of radar data and image data is performed in an application scenario shown in FIG. 1, an unmanned aerial vehicle 10 first obtains a current flight height and a current pitch angle of a gimbal based on a related sensor device and then determines a target height interval within which the current flight height is and a target pitch angle interval within which the current pitch angle is. Then, the unmanned aerial vehicle 10 searches and reads, in a calibration parameter table, a group of calibration parameters matching the foregoing target height interval and target pitch angle interval. Finally, a coordinate conversion relationship between a detection radar coordinate system and a two-dimensional pixel coordinate system is determined by using the read calibration parameters, so that the radar data can be accurately converted in the two-dimensional pixel coordinate system, to implement the data fusion between the radar data and the image data.

For example, depth information of a target object obtained by a detection radar 15 may be converted in the two-dimensional pixel coordinate system, to determine depth information of the target object in a pixel point, to implement functions such as threat terrain warning, threat obstacle highlighting and assisted flight, thereby helping an operator of the unmanned aerial vehicle 10 to obtain an all-day, all-weather and all-terrain all-scenario environmental sensing capability and providing enough time for timely avoidance of dangerous terrain and obstacles.

Figure 7A:
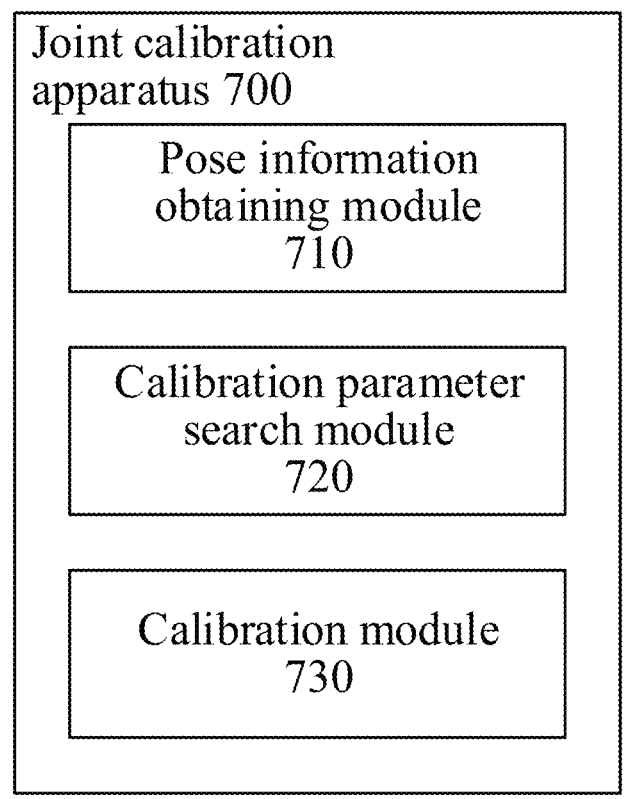
FIG. 7A is a functional block diagram of a joint calibration apparatus according to an embodiment of the present disclosure.

FIG. 7A is a functional block diagram of a joint calibration apparatus according to an embodiment of the present disclosure. As shown in FIG. 7A, a joint calibration apparatus 700 may include a pose information obtaining module 710, a calibration parameter search module 720 and a calibration module 730.

The pose information obtaining module 710 is configured to obtain pose information of a detection radar 15, the pose information including a ground height of the detection radar 15 and a pitch angle of the detection radar 15. The calibration parameter search module 720 is configured to obtain target calibration parameters matching the pose information in a preset calibration parameter set, where the calibration parameter set includes a plurality of groups of calibration parameters, each group of calibration parameters matching a pose information interval and the pose information interval including a height interval and a pitch angle interval. The calibration module 730 is configured to determine a spatial conversion relationship between the detection radar 15 and the image acquisition device 16 based on the target calibration parameters.

In some embodiments, the spatial conversion relationship between the detection radar 15 and the image acquisition device 16 includes: a coordinate correspondence between radar detection data of a target and three-dimensional coordinates of the target in a detection radar coordinate system, a first coordinate conversion relationship between the detection radar coordinate system and an image acquisition device coordinate system, a second coordinate conversion relationship between the image acquisition device coordinate system and a two-dimensional image coordinate system and a third coordinate conversion relationship between the two-dimensional image coordinate system and a two-dimensional pixel coordinate system.

For example, the coordinate correspondence is related to the pose information of the detection radar 15 and changes with the ground height and the pitch angle of the detection radar 15. The radar detection data includes a distance between the detection radar 15 and the target and a target horizontal angle between the detection radar 15 and the target.

Figure 7B:
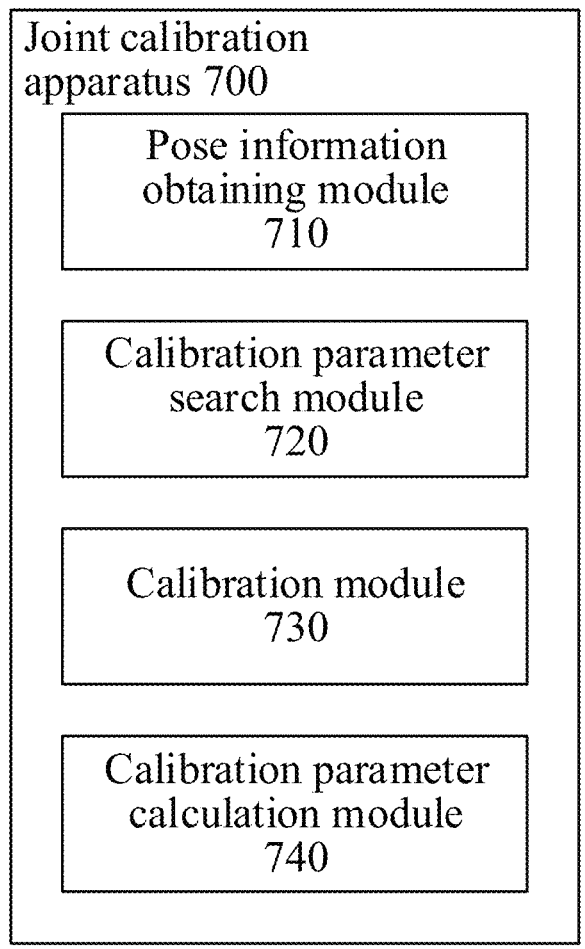
FIG. 7B is a functional block diagram of a joint calibration apparatus according to another embodiment of the present disclosure.

In some other embodiments, as shown in FIG. 7B, the joint calibration apparatus may further include a calibration parameter calculation module 740 configured to generate the calibration parameter set. The calibration parameter calculation module 740 is configured to: generate a plurality of pose information intervals; determine a current pose information interval of the detection radar 15 and calculate a group of calibration parameters matching the current pose information interval; recalculate, after changing the pose information interval of the detection radar 15, another group of calibration parameters matching a changed pose information interval; and record, after calibration parameters matching each pose information interval are calculated, each pose information interval and matched calibration parameters to form the calibration parameter set.

It should be noted that in this embodiment of the present application, functional modules with functional names are used as examples to describe in detail the method steps to be implemented by the joint calibration apparatus provided in this embodiment of the present application. A person skilled in the art may clearly understand that, for simple and clear description, for specific work processes of the foregoing described apparatus and modules, reference may be made to a corresponding process in the foregoing method embodiments. Details are not described herein again. A person of ordinary skill in the art may be aware that, in combination with examples of units and algorithm steps described in the embodiments disclosed in this specification, this application may be implemented by using electronic hardware, computer software, or a combination thereof. To clearly describe interchangeability between the hardware and the software, compositions and steps of each example have been generally described according to functions in the foregoing descriptions. Whether such functions are performed by hardware or software depends on applications and design constraints of the technical solutions. A person skilled in the art may use different methods to implement the described functions for each application, but it should not be considered that the implementation goes beyond the scope of the present disclosure.

A person skilled in the art may use different methods to implement the described functions for each application, but this implementation shall not be considered as going beyond the scope of the present disclosure. The computer software may be stored in a computer-readable storage medium. When being executed, the program may include the processes of the embodiments of the foregoing methods. The storage medium may be a magnetic disk, a compact disc, a read-only memory (ROM), or a random-access memory (RAM).

Figure 8:
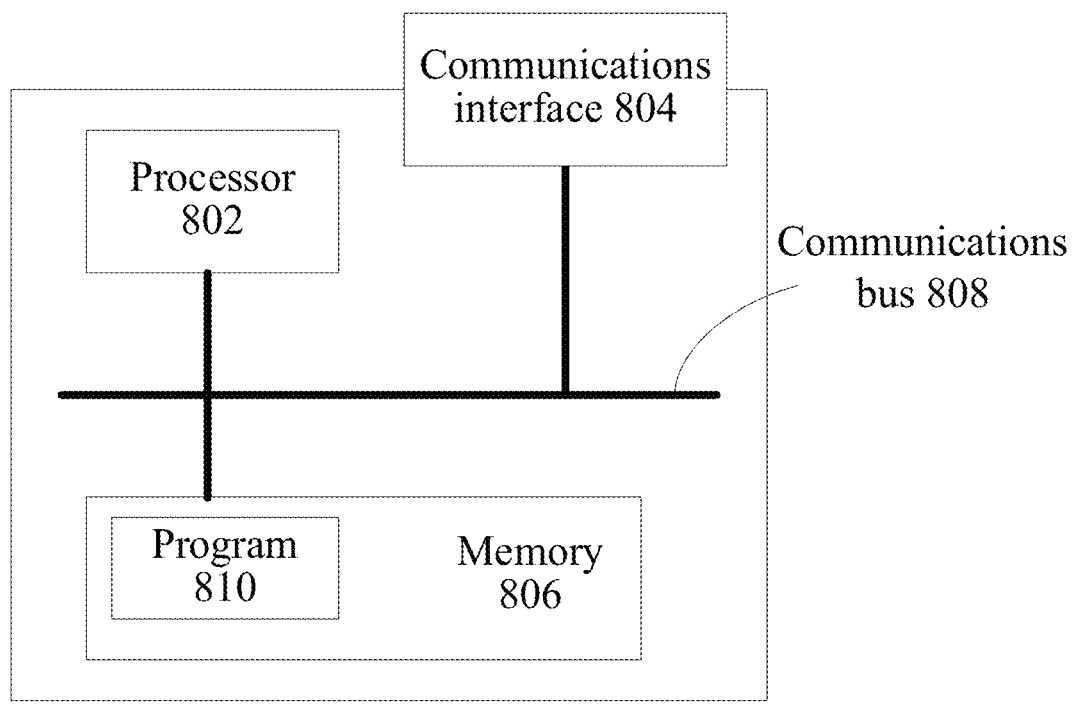
FIG. 8 is a schematic diagram of an electronic device according to an embodiment of the present disclosure.

FIG. 8 is a schematic structural diagram of an electronic device according to an embodiment of the present disclosure. A specific implementation of the electronic device is not limited in this embodiment of the present disclosure. For example, the electronic device may be a flight control chip mounted on the unmanned aerial vehicle 10 shown in FIG. 1.

As shown in FIG. 8, the electronic device may include: a processor 802, a communications interface 804, a memory 806 and a communications bus 808.

The processor 802, the communications interface 804 and the memory 806 complete mutual communication by using the communications bus 808. The communications interface 804 is configured to implement network element communication with another device such as a client, another server or the like. The processor 802 is configured to execute a program 810 and may specifically perform related steps in the foregoing joint calibration method embodiments.

For example, the program 810 may include program code and the program code includes a computer operating instruction. The computer operating instruction may cause the processor 802 to perform the joint calibration method in the foregoing any method embodiment.

In the embodiments of the present disclosure, according to a used hardware type, the processor 802 may be a central processing unit (CPU). The processor 802 may be further another general-purpose processor, a digital signal processor (DSP), an application specific integrated circuit (ASIC), a field-programmable gate array (FPGA), or another programmable logic device, a discrete gate or a transistor logic device, a discrete hardware component or the like.

The memory 806 is configured to store the program 810. The memory 806 may include a high-speed RAM memory, may also include a non-volatile memory, for example, at least one magnetic disk memory, a flash component, or other non-volatile solid-state storage components.

The memory 806 has a program storage area and a data storage area, which are respectively used for storing the program 810 and corresponding data information, for example, a non-volatile software program and a non-volatile computer executable program and module stored in the program storage area, or an operation processing result, radar data, image information and the like stored in the data storage area.

An embodiment of the present disclosure further provides a computer-readable storage medium. The computer-readable storage medium may be a non-volatile computer-readable storage medium. The computer-readable storage medium stores a computer program.

The computer program, when executed by the processor, causes the processor to implement one or more steps in the joint calibration method disclosed in the embodiments of the present disclosure. A complete computer program product is embodied on one or more computer-readable storage mediums (including but not limited to, disk storage, CD-ROM, optical storage and the like) including the computer program disclosed in the embodiments of the present disclosure.

In conclusion, a data entry model constructed by the joint calibration method and apparatus provided in the embodiments of the present disclosure considers impact of a working height and a pitch angle of a millimeter-wave radar on azimuth Direction Of Arrival (DOA) estimation. The data entry model may adaptively adjust calibration parameters to adapt to a working state under any height and pitch angle.

In addition, the foregoing data entry model and the joint calibration method are constructed based on three-dimensional space and have good expandability. On the basis of continuing to use a derivation method and calculation results of the embodiments of the present disclosure, the data entry model may degenerate to a typical two-dimensional data acquisition model by setting the height and the pitch angle to zero at the same time, to be used in a suitable scenario.

One of beneficial effects of the joint calibration method provided in the embodiments of the present disclosure is: calibration parameters can be corrected and updated correspondingly according to an attitude change (for example, changes of a ground height and a pitch angle) of a detection radar, which ensures accuracy of an obtained spatial conversion relationship and improves a data fusion effect of the detection radar and an image acquisition device.

One of beneficial effects of the unmanned aerial vehicle provided in the embodiments of the present disclosure is: by storing a preset calibration parameter table, adaptation of calibration parameters to an attitude change of a detection radar can be implemented with less computing power consumption, thereby providing a more accurate data fusion result. Further, calibration parameters can be corrected according to an attitude change of the detection radar, which ensures effectively improving a data fusion effect of the detection radar and the image acquisition device.

Finally, it should be noted that the foregoing embodiments are merely used for describing the technical solutions of the present disclosure, but are not intended to limit the present disclosure. Under the ideas of the present disclosure, the technical features in the foregoing embodiments or various embodiments may also be combined, the steps may be performed in any order and many other changes of different aspects of the present disclosure also exists as described above. These changes are not provided in detail for simplicity. It should be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions and these modifications or replacements will not cause the essence of corresponding technical solutions to depart from the scope of the technical solutions in the embodiments of the present disclosure.

What is claimed is:

1. A joint calibration method, comprising:
obtaining, by an unmanned aerial vehicle comprising a detection radar and an image acquisition device mounted on a gimbal disposed on a body of the unmanned aerial vehicle, pose information of the detection radar, the pose information comprising a ground height of the detection radar and a pitch angle of the detection radar, wherein the pitch angle is obtained through an inclination angle of the gimbal;
obtaining, by the unmanned aerial vehicle, target calibration parameters matching the pose information in a preset calibration parameter set stored in a flight controller of the unmanned aerial vehicle, wherein
the calibration parameter set comprises a plurality of groups of calibration parameters, each group of calibration parameters matching a pose information interval, and the pose information interval comprising a height interval and a pitch angle interval; and
determining, by the unmanned aerial vehicle, a spatial conversion relationship between the detection radar and an image acquisition device based on the target calibration parameters.

2. The method according to claim 1, wherein the spatial conversion relationship between the detection radar and the image acquisition device comprises:
a coordinate correspondence between radar detection data of a target and three-dimensional coordinates of the target in a detection radar coordinate system;
a first coordinate conversion relationship between the detection radar coordinate system and an image acquisition device coordinate system;
a second coordinate conversion relationship between the image acquisition device coordinate system and a two-dimensional image coordinate system; and
a third coordinate conversion relationship between the two-dimensional image coordinate system and a two-dimensional pixel coordinate system.

3. The method according to claim 2, wherein the coordinate correspondence is related to the pose information of the detection radar; and
the radar detection data comprises a distance between the detection radar and the target and a target horizontal angle between the detection radar and the target.

4. The method according to claim 3, wherein the coordinate correspondence is shown in the following formula:

$$\begin{cases} X_r = R\sin\theta_{radar} \\ Y_r = -\dfrac{BE * OC}{OB} \\ Z_r = H * \sin\alpha + OG * \cos\alpha \end{cases}$$

coordinates of the target in the detection radar coordinate system being $(X_r, Y_r, Z_r)$, R being the distance between the target and the detection radar, O being a coordinate origin of a world coordinate system, B being an intersection between a z axis of the detection radar coordinate system and an x axis of the world coordinate system, C being a coordinate origin of the detection radar coordinate system, G being an intersection between a perpendicular line passing through the target and the x axis of the world coordinate system, E being an intersection between a perpendicular line passing through G and the z axis of the detection radar coordinate system, H being the ground height of the detection radar, α being the pitch angle of the detection radar and $\theta_{radar}$ being the target horizontal angle between the detection radar and the target.

5. The method according to claim 3, wherein the first coordinate conversion relationship is shown in the following formula:

$$\begin{pmatrix} X_c \\ Y_c \\ Z_c \\ 1 \end{pmatrix} = \begin{pmatrix} R & t \\ 0^T & 1 \end{pmatrix} \begin{pmatrix} X_r \\ Y_r \\ Z_r \\ 1 \end{pmatrix}$$

coordinates of the target in the detection radar coordinate system being $(X_r, Y_r, Z_r)$, coordinates of the target in the image acquisition device coordinate system being $(X_c, Y_c, Z_c)$, R being an orthogonal rotation matrix and t being a three-dimensional translation vector.

6. The method according to claim 3, wherein the second coordinate conversion relationship is shown in the following formula:

$$Z_c \begin{pmatrix} x \\ y \\ 1 \end{pmatrix} = \begin{pmatrix} f & 0 & 0 \\ 0 & f & 0 \\ 0 & 0 & 1 \end{pmatrix} \begin{pmatrix} X_c \\ Y_c \\ Z_c \end{pmatrix}$$

coordinates of the target in the image acquisition device coordinate system being $(X_c, Y_c, Z_c)$, coordinates of the target in the two-dimensional image coordinate system being (x, y) and f being a focal length.

7. The method according to claim 3, wherein the third coordinate conversion relationship is shown in the following formula:

$$\begin{pmatrix} u \\ v \\ 1 \end{pmatrix} = \begin{pmatrix} \frac{1}{dx} & 0 & u_0 \\ 0 & \frac{1}{dy} & v_0 \\ 0 & 0 & 1 \end{pmatrix} \begin{pmatrix} x \\ y \\ 1 \end{pmatrix}$$

coordinates of a coordinate origin of the two-dimensional image coordinate system in the two-dimensional pixel coordinate system being $(u_o, v_o)$, coordinates of the target in the two-dimensional pixel coordinate system being (u, v), coordinates of the target in the two-dimensional image coordinate system being (x, y) and d being a ratio of a single pixel length in the two-dimensional pixel coordinate system to a unit length in the two-dimensional image coordinate system.

8. The method according to claim 1, wherein the obtaining target calibration parameters matching the pose information in a preset calibration parameter set further comprises:
refreshing the calibration parameter set when the calibration parameter set is updated; and
traversing, according to current pose information of the detection radar, the calibration parameter set, to obtain a group of calibration parameters matching the current pose information.

9. The method according to claim 8, further comprising:
generating a plurality of pose information intervals;
determining a current pose information interval of the detection radar and calculating a group of calibration parameters matching the current pose information interval;
recalculating, after changing the pose information interval of the detection radar, another group of calibration parameters matching a changed pose information interval; and
recording, after calibration parameters matching each pose information interval are calculated, each pose information interval and matched calibration parameters to form the calibration parameter set.

10. The method according to claim 9, wherein the generating a plurality of pose information intervals further comprises:
dividing a preset ground height range into m continuous height intervals and dividing a preset pitch angle range into n continuous pitch angle intervals; and
combining each height interval with the n pitch angle intervals respectively, to generate m*n different pose information intervals.

11. The method according to claim 10, wherein the dividing a preset ground height range into m continuous height intervals further comprises:
setting a division step value of the height intervals; and
dividing the ground height range into m height intervals according to the following formula:

$$H_m = \text{ceil}\left(\frac{H_{max} - H_{min}}{\Delta H}\right)$$

a subscript m being a sequence number of the height interval, ceil being rounding up, $H_{max}$ being an upper limit value of the ground height range, $H_{min}$ being a lower limit value of the ground height range and $\Delta H$ being the division step value; and
the dividing a preset pitch angle range into n continuous pitch angle intervals further comprises:
setting a division step value of the pitch angle intervals; and
dividing the pitch angle range into n pitch angle intervals according to the following formula:

$$\alpha_n = \text{ceil}\left(\frac{\alpha_{max} - \alpha_{min}}{\Delta \alpha}\right)$$

a subscript n being a sequence number of the pitch angle interval, ceil being rounding up, $\alpha_{max}$ being an upper limit value of the pitch angle range, $\alpha_{min}$ being a lower limit value of the pitch angle range and $\Delta \alpha$ being the division step value.

12. The method according to claim 9, wherein the calculating one group of calibration parameters matching the current pose information interval further comprises:
obtaining a plurality of pieces of test coordinate data under the pose information; and
calculating and determining, through the test coordinate data, to-be-determined parameters in a preset spatial conversion function as the calibration parameters, wherein
the preset spatial conversion function is configured to represent the spatial conversion relationship between the detection radar and the image acquisition device.

13. The method according to claim 12, wherein the spatial conversion relationship between the detection radar and the image acquisition device comprises a coordinate conversion relationship between the detection radar coordinate system and the two-dimensional pixel coordinate system; and
the test coordinate data comprises first coordinate data of a test point in the detection radar coordinate system and second coordinate data of the same test point in the two-dimensional pixel coordinate system.

14. The method according to claim 12, further comprising:
establishing the coordinate correspondence between the radar detection data of the target and the three-dimensional coordinates of the target in the detection radar coordinate system;
successively determining the first coordinate conversion relationship between the detection radar coordinate system and the image acquisition device coordinate system, the second coordinate conversion relationship between the image acquisition device coordinate system and the two-dimensional image coordinate system and the third coordinate conversion relationship between the two-dimensional image coordinate system and the two-dimensional pixel coordinate system; and integrating the coordinate correspondence, the first coordinate conversion relationship, the second coordinate conversion relationship and the third coordinate conversion relationship, to obtain the preset spatial conversion function, wherein the coordinate correspondence is related to the pose information of the detection radar and the radar detection data comprises the distance between the detection radar and the target and the target horizontal angle between the detection radar and the target.

15. The method according to claim 13, wherein the preset spatial conversion function is shown in the following formula:

$$p=K[R\ t]q$$

coordinates q being the first coordinate data, coordinates p being the second coordinate data, K being an intrinsic parameter of the image acquisition device, R being the orthogonal rotation matrix and t being the three-dimensional translation vector; and the orthogonal rotation matrix and the three-dimensional translation vector comprise a plurality of to-be-determined parameters shown in the following formula:

$$w=[\theta_x,\theta_y,\theta_z,t_x,t_y,t_z],$$

$\theta_x$, $\theta_y$ and $\theta_z$ being respectively rotation angles of coordinate axes and $t_x$, $t_y$ and $t_z$ being respectively movement amounts of the coordinate axes in corresponding directions.

16. The method according to claim 15, wherein the calculating and determining, through the test coordinate data, to-be-determined parameters in a preset spatial conversion function further comprises:

calculating and determining the to-be-determined parameters by calculating a nonlinear optimal solution of the following constraint function:

$$\operatorname*{argmin}_{w}\sum_{i=1}^{N}\|\tilde{q}_i - K[R\ t]\tilde{p}_i\|_2^2$$

p being coordinate data of the test point in the two-dimensional pixel coordinate system, q being coordinate data of the test point in the detection radar coordinate system, K being the intrinsic parameter of the image acquisition device, R being the orthogonal rotation matrix and t being the three-dimensional translation vector.

17. An electronic device, comprising at least one processor and a memory communicatively connected to the at least one processor, the memory storing instructions executable by the at least one processor, the instructions being executed by the at least one processor, to cause the at least one processor to perform a plurality of operations comprising:

obtaining pose information of a detection radar and an image acquisition device mounted on a gimbal disposed on a body of an unmanned aerial vehicle, the pose information comprising a ground height of the detection radar and a pitch angle of the detection radar, wherein the pitch angle is obtained through an inclination angle of the gimbal;

obtaining target calibration parameters matching the pose information in a preset calibration parameter set, wherein the calibration parameter set comprises a plurality of groups of calibration parameters, each group of calibration parameters matching a pose information interval, and the pose information interval comprising a height interval and a pitch angle interval; and determining a spatial conversion relationship between the detection radar and an image acquisition device based on the target calibration parameters.

18. An unmanned aerial vehicle, comprising:

a body, a detection radar and an image acquisition device being disposed on the body;

a gimbal disposed on an abdomen portion of the body, wherein the detection radar and the image acquisition device being mounted on the gimbal;

arms, connected to the body;

power apparatuses, disposed on the arms and configured to provide power for the unmanned aerial vehicle to fly; and a flight controller, disposed on the body and communicatively connected to the detection radar and the image acquisition device respectively, wherein the flight controller stores a preset calibration parameter set and is configured to perform a plurality of operations, to determine a correspondence between radar data of the detection radar and image data of the image acquisition device, the operations comprising:

obtaining pose information of a detection radar, the pose information comprising a ground height of the detection radar and a pitch angle of the detection radar, wherein the pitch angle is obtained through an inclination angle of the gimbal;

obtaining target calibration parameters matching the pose information in a preset calibration parameter set, wherein the calibration parameter set comprises a plurality of groups of calibration parameters, each group of calibration parameters matching a pose information interval, and the pose information interval comprising a height interval and a pitch angle interval; and determining a spatial conversion relationship between the detection radar and an image acquisition device based on the target calibration parameters.

19. The unmanned aerial vehicle according to claim 18, further comprising a height finder radar, the height finder radar being disposed on the body and being configured to detect a ground height of the unmanned aerial vehicle, wherein the flight controller is configured to obtain a ground height of the detection radar through the ground height of the unmanned aerial vehicle detected by the height finder radar.

20. The electronic device according to claim 17, wherein the electronic device is configured to be mounted on an unmanned aerial vehicle, wherein the unmanned aerial vehicle further comprises a height finder radar disposed on a body of the unmanned aerial vehicle, and wherein the at least one processor is further configured to obtain a ground height of the detection radar through a ground height of the unmanned aerial vehicle detected by the height finder radar.

* * * * *